(12) United States Patent
Xiao

(10) Patent No.: US 10,115,209 B2
(45) Date of Patent: Oct. 30, 2018

(54) IMAGE TARGET TRACKING METHOD AND SYSTEM THEREOF

(71) Applicant: ULSee Inc., Taipei (TW)

(72) Inventor: Jingjing Xiao, Beijing (CN)

(73) Assignee: ULSee Inc., Taipei (TW)

( * ) Notice: Subject to any disclaimer, the term of this patent is extended or adjusted under 35 U.S.C. 154(b) by 0 days.

(21) Appl. No.: 15/468,185

(22) Filed: Mar. 24, 2017

(65) Prior Publication Data

US 2018/0053318 A1 Feb. 22, 2018

(30) Foreign Application Priority Data

Aug. 22, 2016 (CN) .......................... 2016 1 0702053

(51) Int. Cl.
| | | |
|---|---|---|
| *G06K 9/00* | (2006.01) | |
| *G06T 7/70* | (2017.01) | |
| *G06K 9/46* | (2006.01) | |

(52) U.S. Cl.
CPC .............. *G06T 7/70* (2017.01); *G06K 9/4604* (2013.01); *G06T 2207/30241* (2013.01)

(58) Field of Classification Search
None
See application file for complete search history.

(56) References Cited

U.S. PATENT DOCUMENTS

| | | |
|---|---|---|
| 8,121,346 B2 | 2/2012 | Williams |
| 8,660,302 B2 | 2/2014 | Woo et al. |
| 8,988,529 B2 | 3/2015 | Kokubun |
| 8,994,652 B2 | 3/2015 | Fleischmann et al. |
| 9,008,840 B1 | 4/2015 | Ponulak et al. |
| 9,052,386 B2 | 6/2015 | Yeredor et al. |
| 9,269,012 B2 | 2/2016 | Fotland |
| 9,336,606 B2 | 5/2016 | Guan et al. |
| 2008/0154154 A1 | 6/2008 | Sarvazyan et al. |
| 2016/0189392 A1 | 6/2016 | Tsuji |

*Primary Examiner* — Stephen Coleman
(74) *Attorney, Agent, or Firm* — Alan D. Kamrath; Kamrath IP Lawfirm, P.A.

(57) ABSTRACT

An image target tracking method and system thereof are provided in the present disclosure. The image target tracking method includes the following steps: determining a relative position between a target and a camouflage interference in an image; generating a prediction trajectory according to the relative position between the target and the camouflage interference in the image; and correlating an observation sample position with the prediction trajectory to generate a correlation result, and determining whether the target is blocked and tracking the target according to the correlation result. Throughout the process, the prediction trajectory is generated based on the determined relative position between the target and the camouflage interference, and the prediction trajectory is correlated to determine whether the target is blocked and to accurately track the target.

8 Claims, 4 Drawing Sheets

IMAGE TARGET TRACKING METHOD AND SYSTEM THEREOF

FIELD OF THE DISCLOSURE

The present disclosure relates to an image processing technology, and more particularly to an image target tracking method and system thereof.

BACKGROUND OF THE INVENTION

With the application of video cameras in the field of urban security, image-information-based target tracking algorithms attract research enthusiasm of industry and academia. In the past three decades, the image tracking algorithm has made great progress. However, there are still many open problems that do not have perfect solutions, such as, large deformation of the target, change of viewing angles, change of lights, noisy background, interference, shelters, and other issues.

A traditional target tracking scheme is based on modeling of the target object completion algorithm, which mainly include three parts: 1) an extraction of the target feature model; 2) a multi-feature fusion model matching algorithm; and 3) a real-time update scheme of the algorithm.

Based on the traditional target tracking scheme, a tracker can deal with some traditional problems, such as large deformation of the target, change of lights and rapid movement. However, when a camouflage is existed in the environment, the image target cannot be well tracked since the image target is blocked. For example, in the crowd, when the tracking object (pedestrian) is blocked, the traditional image target tracking scheme may erroneously track other pedestrians.

Hence, how to improve the image target tracking scheme has become an important topic for the person skilled in the art.

SUMMARY OF THE INVENTION

Based on this, in connection with the problem that a traditional image target tracking scheme cannot achieve accurate tracking, it is necessary to provide an image target tracking method and system thereof which can accurately track a target.

It is one objective of the present disclosure to provide an image target tracking method.

According to one exemplary embodiment of the present disclosure, an image target tracking method is provided. The image target tracking method includes the following steps: determining a relative position between a target and a camouflage interference in an image; generating a prediction trajectory according to the relative position between the target and the camouflage interference in the image; and correlating an observation sample position with the prediction trajectory to generate a correlation result, and determining whether the target is blocked and tracking the target according to the correlation result.

It is one objective of the present disclosure to provide an image target tracking system.

According to one exemplary embodiment of the present disclosure, an image target tracking system is provided. The image target tracking system is applied to the abovementioned image target tracking method. The image target tracking system includes a position determining module, a prediction trajectory generating module, and a tracking module. The position determining module is configured to determine a relative position between a target and a camouflage interference in an image. The prediction trajectory generating module is configured to generate a prediction trajectory according to the relative position between the target and the camouflage interference in the image. The tracking module is configured to correlate an observation sample position with the prediction trajectory to generate a correlation result, and determine whether the target is blocked and track the target according to the correlation result.

The image target tracking method and system thereof provided in the present disclosure may determine a relative position between a target and a camouflage interference in an image, generate a prediction trajectory according to the relative position between the target and the camouflage interference in the image, correlate an observation sample position with the prediction trajectory to generate a correlation result, and determine whether the target is blocked and track the target according to the correlation result. Throughout the process, the prediction trajectory is generated based on the determined relative position between the target and the camouflage interference, and the prediction trajectory is correlated to determine whether the target is blocked and to accurately track the target.

These and other objectives of the present disclosure will no doubt become obvious to those of ordinary skill in the art after reading the following detailed description of the preferred embodiment that is illustrated in the various figures and drawings.

DESCRIPTION OF THE PREFERRED EMBODIMENTS

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Figure 1:
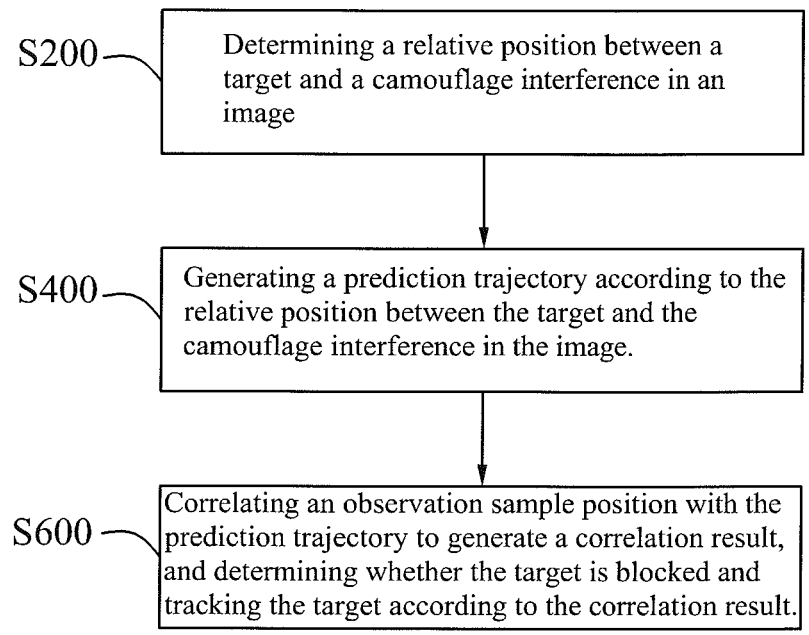
FIG. 1 is a flowchart illustrating the procedures of an image target tracking method according to a first embodiment of the present disclosure.

Please refer to FIG. 1. FIG. 1 is a flowchart illustrating the procedures of an image target tracking method according to a first embodiment of the present disclosure. As shown in FIG. 1, the method may include the following steps S200, S400, and S600.

S200: Determining a relative position between a target and a camouflage interference in an image.

The relative position between the target and the camouflage interference in the image may be determined in a number of ways. Specifically, it can be determined by means of existing image recognition and positioning technology and historical experience data, or it can also be determined by real-time data processing methods. A specific embodiment which determines the relative position between the target and the camouflage interference in the image based on real-time acquired image data will be described in detail below.

In one embodiment, the step S200 may include the following steps.

Step 1: Acquiring a target initial position, and performing a sparse sampling based on the target initial position. An image containing the target is extracted in order to acquire the target initial position. The methods for acquiring the target initial position are different in different application scenarios. In particular, they can be divided into two cases: a first case is that a previous frame image is existed, and a second case is that a previous frame image is absent. For the first case that a previous frame image is existed, the target initial position can be acquired directly by acquiring the position of the target in the previous frame image. For the second case that a previous frame image is absent, the target initial position can be acquired by acquiring a target predetermined position. The details will be illustrated by the following example. Assuming that continuous images containing the target have been collected before the current time point (for example, the frame image collected at the current time point is a $10^{th}$ frame image from the beginning of acquisition), the target initial position can be acquired from the collected $9^{th}$ frame image containing the target. Assuming that continuous images containing the target have not been collected before the current time point, (i.e., the frame image collected at the current time point is a $1^{st}$ frame image from the beginning f acquisition), the target initial position can be acquired by acquiring the target predetermined position. In one embodiment, the target predetermined position can be set randomly or based on actual application scenarios and historical experience data. A spare sampling may be performed around the target initial position based on the target initial position to acquire a plurality of sampling points. In another embodiment, an uniform sparse sampling may be performed around the target initial position in order to acquire a plurality of more neat sampling points, which is beneficial to reduce the load of post-data processing.

Step 2: Dividing sampling points into foreground sampling points and background sampling points.

The sampling points acquired in Step 1 are divided into foreground sampling points and background sampling points, wherein the foreground sampling points may contain the target, and may also contain the camouflage interference. A point differentiation process is adopted, which includes: firstly, color features of each sampling point in the sparse samples are extracted. After the sparse sampling in Step 1 is performed, a plurality of sampling points will be acquired, and the color features in each sampling point are extracted. Specially, the histogram of color feature of each sampling point is extracted, and then the gradient histogram feature of color intensity is obtained. The extracted color feature is matched with the gradient histogram feature of color intensity in order to obtain a matching result. The gradient histogram feature of color intensity is the feature extracted by dividing the existing image target feature, wherein the gradient model is a histogram of oriented gradient (HOG). In one embodiment, the color feature extracted in the sampling point can be matched with the color feature in the model by using a Bhattacharyya distance calculation method, wherein one matching value can be obtained from each sampling point. Finally, according to the matching result and the spatial position information of the sampling points, the sampling points can be divided into foreground sampling points and background sampling points by Gaussian clustering algorithm. The clustering algorithm is a statistical analysis method for researching (sample or index) classification problem, and it is also an important algorithm for data mining. The clustering analysis is composed of several models, wherein usually a model is a vector of a measure or a point in a multidimensional space. The clustering analysis is based on similarity. There is more similarity between models in a same cluster than between models in different clusters. In one embodiment, according to the color matching result and the spatial position information of each sampling point, the sampling points are divided into foreground sampling points and background sampling points by using Gaussian clustering algorithm.

Step 3: Clustering adjacent foreground sampling points according to the spatial distribution of the foreground sampling points in order to obtain a clustering result containing a plurality of clusters.

After the sampling points are divided into foreground sampling points and background sampling points, all foreground sampling points are traversed. Adjacent foreground sampling points are re-clustered according to the spatial distribution of the foreground sampling points in order to obtain the clustering result containing a plurality of clusters. In one embodiment, overlapping regions of the foreground sampling points in the spatial distribution can be mainly considered. The overlapping region is re-clustered in order to obtain that clustering result containing a plurality of clusters. Specifically, the clustering process includes the following steps. Firstly, the overlapping region of foreground sampling points is obtained according to the spatial distribution of the foreground sampling points. After the foreground sampling points and the background sampling points are distinguished, all foreground sampling points are traversed for analyzing the spatial distribution of the foreground sampling points in order to find the overlapping region of the foreground sampling points. Finally, the foreground sampling points are clustered according to the overlapping region of the foreground sampling points in order to obtain the clustering result containing a plurality of clusters. A spatial clustering is performed on the foreground sampling points having the overlapping region again, and the foreground sampling points are divided into different clusters according to the spatial distribution.

Step 4: Performing a robust estimation according to the clustering result in order to determine the relative position between the target and the camouflage interference in the image. In particular, the whole determining process includes the following steps. Firstly, a cluster dense sampling is performed according to the clustering result, and the gradient feature is extracted from the dense sampling. The extracted gradient feature is matched with a predetermined gradient model for obtaining a matching value, and then a corresponding position of the gradient matching mean point and a corresponding position of the highest gradient matching value point are obtained. Finally, a robust estimation is performed according to the corresponding position of the gradient matching mean point and the corresponding position of the highest gradient matching value point in order to determine the relative position between the target and the camouflage interference in the image.

In one embodiment, the abovementioned step for performing a robust estimation according to the corresponding position of the gradient matching mean point and the corresponding position of the highest gradient matching value point in order to determine the relative position between the target and the camouflage interference in the image may include the following steps.

(1) An iterative clustering and a potential target region estimation are performed on dense sampling points within each cluster according to the corresponding position of the gradient matching mean point and the corresponding position of the highest gradient matching value point.

(2) When an offset between the corresponding position of each gradient matching mean point and the corresponding position of each highest gradient matching value point is less than a predetermined value, the iteration is stopped, and a target having the overlapping region is searched.

(3) The relative position between the target and the camouflage interference in the image is determined.

The corresponding position of the gradient matching mean point is obtained according to the matching value. An iterative clustering and a target region estimation are performed on dense sampling points within each cluster according to the corresponding position of the highest gradient matching value point. The iteration is stopped until that the corresponding position of the gradient matching mean point is close enough to the corresponding position of the highest gradient matching value point. The estimation of the target position is completed by using the relative position between the target and the camouflage interference in the image. In practice, the corresponding position of the gradient matching mean point is close enough to the corresponding position of the highest gradient matching value point can be implemented by setting that an offset between the corresponding position of each gradient matching mean point and the corresponding position of each highest gradient matching value point is less than a predetermined value. More specifically, the predetermined value is 50%, that is, when the offset between the corresponding position of each gradient matching mean point and the corresponding position of each highest gradient matching value point is less than 50%, the iteration is stopped, and the target having the overlapping region is searched.

S400: Generating a prediction trajectory according to the relative position between the target and the camouflage interference in the image.

In particular, the prediction trajectory may include a target trajectory and a camouflage interference trajectory.

S600: Correlating an observation sample position with the prediction trajectory to generate a correlation result, and determining whether the target is blocked and tracking the target according to the correlation result.

Based on the step S400 for generating the prediction trajectory, the observation sample position acquired in real time can be correlated with the prediction trajectory to obtain a correlation result. Whether the target is blocked is determined according to the correlation result in order to accurately track the target. In particular, the target position can be predicted by using the relative position between the target and the camouflage interference, and then the observation sample position is correlated with the prediction trajectory. If the appropriate correlation object (the target) is not found, determining that the target is blocked; and if the appropriate correlation object (the target) is found, the target is tracked.

The image target tracking method of the present disclosure includes the following steps: determining a relative position between a target and a camouflage interference in an image; generating a prediction trajectory according to the relative position between the target and the camouflage interference in the image; and correlating an observation sample position with the prediction trajectory to generate a correlation result, and determining whether the target is blocked and tracking the target according to the correlation result. Throughout the process, the prediction trajectory can be generated based on the relative position between the target and the camouflage interference, and the prediction trajectory is correlated to determine whether the target is blocked and to accurately track the target.

Figure 2:
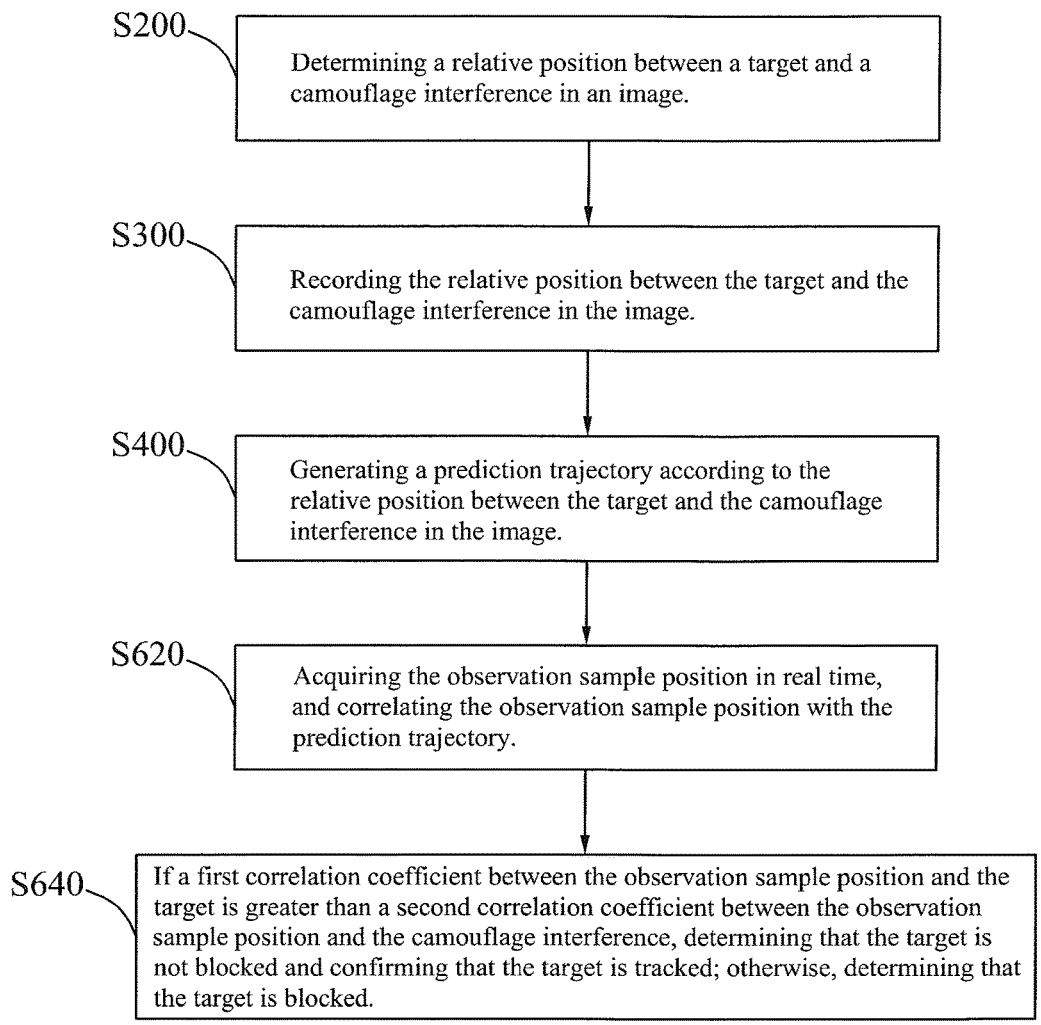
FIG. 2 is a flowchart illustrating the procedures of an image target tracking method according to a second embodiment of the present disclosure.

Please refer to FIG. 2. FIG. 2 is a flowchart illustrating the procedures of an image target tracking method according to a second embodiment of the present disclosure. As shown in FIG. 2, in one embodiment, the step S600 further includes the following steps S620 and S640.

S620: Acquiring the observation sample position in real time, and correlating the observation sample position with the prediction trajectory The whole image with the camouflage interference is observed so as to acquire the observation sample position in real time, and the observation sample position is correlated with the prediction trajectory. In practice, there may be many observation sample positions. In order to determine whether the target is blocked and track the target more easily, the observation sample positions ca be screened.

S640: If a first correlation coefficient between the observation sample position and the target is greater than a second correlation coefficient between the observation sample position and the camouflage interference, determining that the target is not blocked and confirming that the target is tracked; otherwise, determining that the target is blocked.

If the first correlation coefficient between the observation sample position and the target is greater than the second correlation coefficient between the observation sample position and the camouflage interference, determining that the target is not blocked and confirming that the target is tracked. Otherwise, if all of the existing observation samples are identified as camouflage interference, determining that the target is blocked by the camouflage interference.

In one embodiment, the step of correlating the observation sample position with the prediction trajectory includes the following steps.

Step 1: Separately matching the observation sample position with the target trajectory and the camouflage interference trajectory through a Bayesian probability algorithm.

Step 2: Calculating an observation weight value corresponding to the observation sample position, wherein the higher the observation weight value when the observation sample position is more similar to the target trajectory, and the lower the observation weight value when the observation sample position is more similar to the camouflage interference trajectory.

Step 3: Selecting the observation sample position having a highest observation weight value to be correlated with the prediction trajectory.

By adopting the abovementioned method, the most similar observation sample position may be selected to be correlated with the prediction trajectory, such that finally the target can be tracked more accurately.

In one embodiment, the step of generating the prediction trajectory according to the relative position between the target and the camouflage interference in the image includes the following step: generating the prediction trajectory according to the relative position between the target and the camouflage interference in the image and a historical information, wherein the historical information includes a historical image position of the target, a historical image position of the camouflage interference, a historical number of the target, a historical number of the camouflage interference, and a relative position between the target and the camouflage interference in a historical image.

In this embodiment, through considering the relative position between the target and the camouflage interference in the image and the historical information, the prediction trajectory may be obtained more accurately, such that finally the target can be tracked more accurately.

As shown in FIG. 2, in one embodiment, after the step S200, the method further includes the step S300.

S300: Recording the relative position between the target and the camouflage interference in the image.

On one hand, it can effectively prevent data lost due to accidents through recording the relative position between the target and the camouflage interference in the image. On the other hand, it is helpful for further study on the relative position between the target and the camouflage interference in the image.

Figure 3:
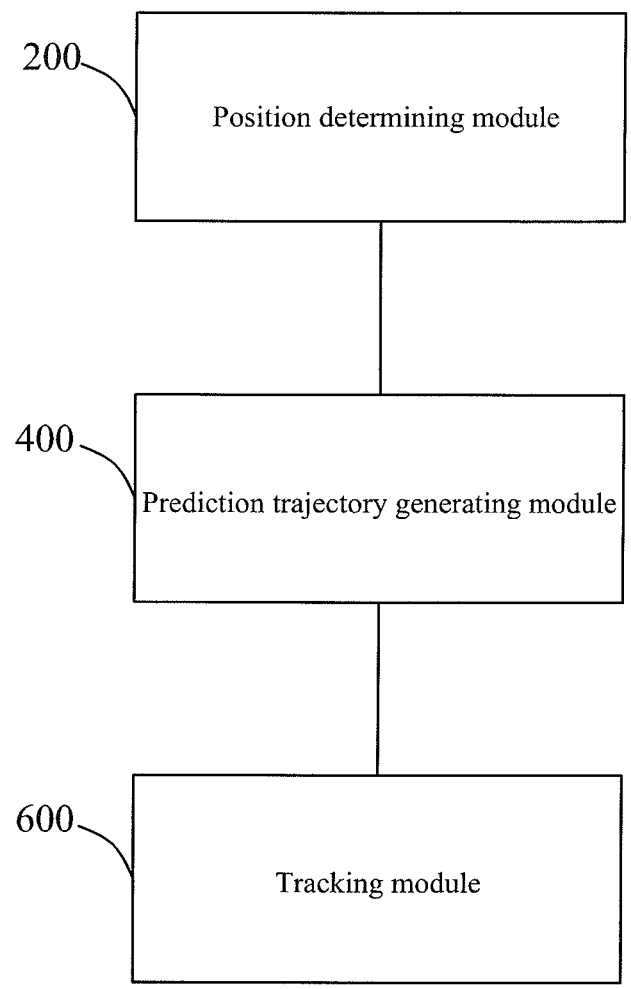
FIG. 3 is a block diagram of an image target tracking system according to a first embodiment of the present disclosure.

Please refer to FIG. 3. FIG. 3 is a block diagram of an image target tracking system according to a first embodiment of the present disclosure. As shown in FIG. 3, the image target tracking system includes a position determining module 200, a prediction trajectory generating module 400, and a tracking module 600. The position determining module 200 is configured to determine a relative position between a target and a camouflage interference in an image. The prediction trajectory generating module 400 is configured to generate a prediction trajectory according to the relative position between the target and the camouflage interference in the image. The tracking module 600 is configured to correlate an observation sample position with the prediction trajectory to generate a correlation result, and determine whether the target is blocked and track the target according to the correlation result.

The image target tracking system provided in the present disclosure uses the position determining module 200 to determine a relative position between a target and a camouflage interference in an image, uses the prediction trajectory generating module 400 to generate a prediction trajectory according to the relative position between the target and the camouflage interference in the image, and uses the tracking module 600 to correlate an observation sample position with the prediction trajectory to generate a correlation result, and to determine whether the target is blocked and to track the target according to the correlation result. Throughout the process, the prediction trajectory is generated based on the determined relative position between the target and the camouflage interference, and the prediction trajectory is correlated to determine whether the target is blocked and to accurately track the target.

Figure 4:
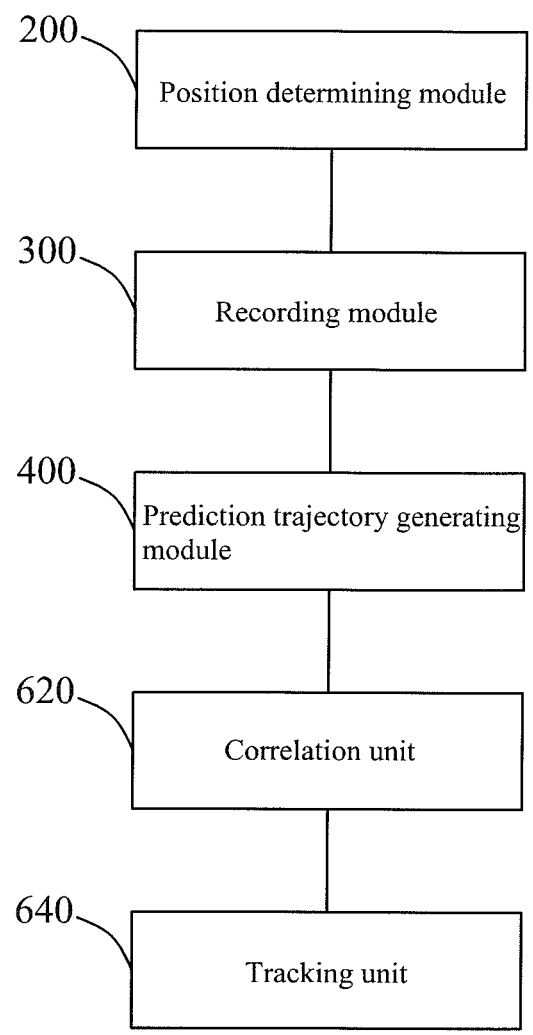
FIG. 4 is a block diagram of an image target tracking system according to a second embodiment of the present disclosure.

Please refer to FIG. 4. FIG. 4 is a block diagram of an image target tracking system according to a second embodiment of the present disclosure. As shown in FIG. 4, in one example, the tracking module 600 may include a correlation unit 620 and a tracking unit 640. The correlation unit 620 is configured to acquire the observation sample position in real time, and correlate the observation sample position with the prediction trajectory. The tracking unit 640 is configured to determine that the target is not blocked and confirm that the target is tracked if a first correlation coefficient between the observation sample position and the target is greater than a second correlation coefficient between the observation sample position and the camouflage interference; otherwise, the tracking unit 640 is configured to determine that the target is blocked.

According to one embodiment, the prediction trajectory includes a target trajectory and a camouflage interference trajectory, and the tracking module 600 further includes: a matching unit, an observation weight value calculating unit, and a correlation performing unit. The matching unit is configured to separately match the observation sample position with the target trajectory and the camouflage interference trajectory through a Bayesian probability algorithm. The observation weight value calculating unit is configured to calculate an observation weight value corresponding to the observation sample position, wherein the higher the observation weight value when the observation sample position is more similar to the target trajectory, and the lower the observation weight value when the observation sample position is more similar to the camouflage interference trajectory. The correlation performing unit is configured to select the observation sample position having a highest observation weight value to be correlated with the prediction trajectory.

According to one embodiment, the prediction trajectory generating module 400 is configured to generate the prediction trajectory according to the relative position between the target and the camouflage interference in the image and a historical information, wherein the historical information includes a historical image position of the target, a historical image position of the camouflage interference, a historical number of the target, a historical number of the camouflage interference, and a relative position between the target and the camouflage interference in a historical image.

As shown in FIG. 4, in one embodiment, the image target tracking system further includes a recording module 300. The recording module 300 is configured to record the relative position between the target and the camouflage interference in the image.

Reference in the specification to "one example" or "an example" means that a particular feature, structure, or characteristic described in connection with the example is included in at least an implementation. The appearances of the phrase "in one example" in various places in the specification are not necessarily all referring to the same example. Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The above are only preferred examples of the present disclosure is not intended to limit the present disclosure within the spirit and principles of the present disclosure, any changes made, equivalent replacement, or improvement in the protection of the present disclosure should contain within the range.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image target tracking method, comprising:
   determining a relative position between a target and a camouflage interference in an image;
   generating a prediction trajectory according to the relative position between the target and the camouflage interference in the image; and
   correlating an observation sample position with the prediction trajectory to generate a correlation result, and determining whether the target is blocked and tracking the target according to the correlation result, wherein the step of correlating the observation sample position with the prediction trajectory to generate the correlation result, and determining whether the target is blocked and tracking the target according to the correlation result comprises:
   acquiring the observation sample position in real time, and correlating the observation sample position with the prediction trajectory; and
   if a first correlation coefficient between the observation sample position and the target is greater than a second correlation coefficient between the observation sample position and the camouflage interference, determining that the target is not blocked and confirming that the target is tracked;
   otherwise, determining that the target is blocked.

2. The image target tracking method according to claim 1, wherein the prediction trajectory comprises a target trajectory and a camouflage interference trajectory; and the step of correlating an observation sample position with the prediction trajectory comprises:
   separately matching the observation sample position with the target trajectory and the camouflage interference trajectory through a Bayesian probability algorithm;
   calculating an observation weight value corresponding to the observation sample position, wherein the higher the observation weight value when the observation sample position is more similar to the target trajectory, and the lower the observation weight value when the observation sample position is more similar to the camouflage interference trajectory; and
   selecting the observation sample position having a highest observation weight value to be correlated with the prediction trajectory.

3. The image target tracking method according to claim 1, wherein the step of generating the prediction trajectory according to the relative position between the target and the camouflage interference in the image comprises:
   generating the prediction trajectory according to the relative position between the target and the camouflage interference in the image and a historical information, wherein the historical information includes a historical image position of the target, a historical image position of the camouflage interference, a historical number of the target, a historical number of the camouflage interference, and a relative position between the target and the camouflage interference in a historical image.

4. The image target tracking method according to claim 1, wherein after the step of determining the relative position between the target and the camouflage interference in an image, the method further comprises:
   recording the relative position between the target and the camouflage interference in the image.

5. An image target tracking system, comprising:
   a position determining module, configured to determine a relative position between a target and a camouflage interference in an image;
   a prediction trajectory generating module, configured to generate a prediction trajectory according to the relative position between the target and the camouflage interference in the image; and
   a tracking module, configured to correlate an observation sample position with the prediction trajectory to generate a correlation result, and determine whether the target is blocked and track the target according to the correlation result;
   wherein the tracking module further comprises:
   a correlation unit, configured to acquire the observation sample position in real time, and correlate the observation sample position with the prediction trajectory; and
   a tracking unit, configured to determine that the target is not blocked and confirm that the target is tracked if a first correlation coefficient between the observation sample position and the target is greater than a second correlation coefficient between the observation sample position and the camouflage interference; otherwise, the tracking unit is configured to determine that the target is blocked.

6. The image target tracking system according to claim 5, wherein the prediction trajectory comprises a target trajectory and a camouflage interference trajectory; and the tracking module further comprises:
   a matching unit, configured to separately match the observation sample position with the target trajectory and the camouflage interference trajectory through a Bayesian probability algorithm; an observation weight value calculating unit, configured to calculate an observation weight value corresponding to the observation sample position, wherein the higher the observation weight value when the observation sample position is more similar to the target trajectory, and the lower the observation weight value when the observation sample position is more similar to the camouflage interference trajectory; and
   a correlation performing unit, configured to select the observation sample position having a highest observation weight value to be correlated with the prediction trajectory.

7. The image target tracking system according to claim 5, wherein the prediction trajectory generating module is configured to generate the prediction trajectory according to the relative position between the target and the camouflage interference in the image and a historical information, wherein the historical information includes a historical image position of the target, a historical image position of the camouflage interference, a historical number of the target, a historical number of the camouflage interference, and a relative position between the target and the camouflage interference in a historical image.

8. The image target tracking system according to claim 5, further comprising:
   a recording module, configured to record the relative position between the target and the camouflage interference in the image.

* * * * *